Jan. 21, 1958  J. ZUBATY  2,820,673
FUEL INJECTING VALVE
Filed Nov. 19, 1956
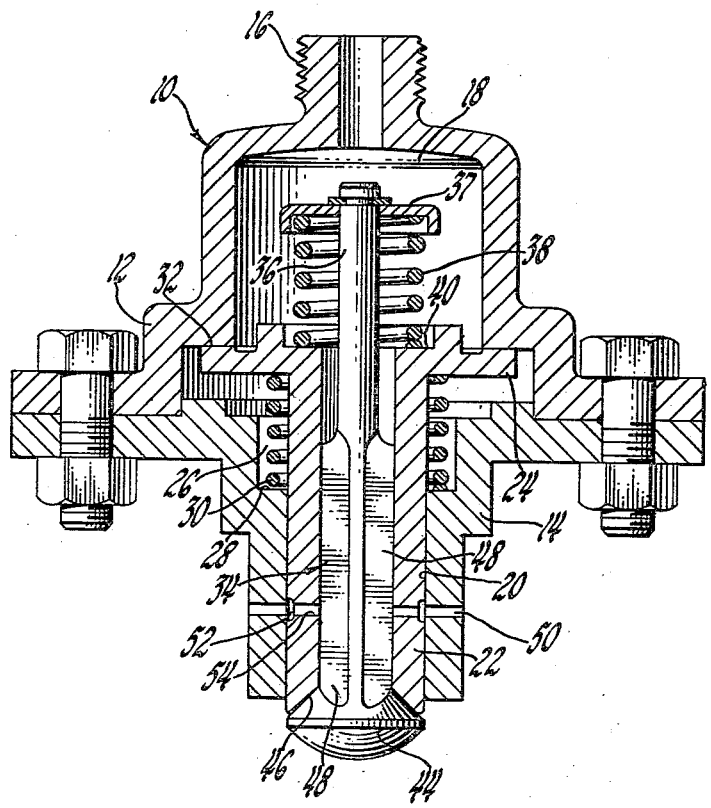
INVENTOR.
Joseph Zubaty
BY
R. T. Barnard
ATTORNEY.

United States Patent Office 2,820,673
Patented Jan. 21, 1958

2,820,673

FUEL INJECTING VALVE

Joseph Zubaty, Flint, Mich., assignor to General Motors Corporation, Detroit, Mich., a corporation of Delaware Application November 19, 1956, Serial No. 623,242

5 Claims. (Cl. 299—107.6)

The present invention relates to a fuel injecting valve of a unique design adapted to insure that fuel lines are filled only with liquid fuel.

In all fuel injecting systems it is important that the fuel lines be filled with liquid fuel and that all vapors, whether fuel or air, be eliminated therefrom to insure a continuous flow of fuel. To this end, the subject valve device has been developed and in effect includes valve means normally open to the atmosphere so as to permit non-liquid fuel or air to be vented but which valve is adapted to be closed by the presence of liquid fuel which at the same time opens an additional valve permitting the passage of said liquid fuel out of the valve device.

The drawing represents a preferred embodiment of the subject valve device.

The valve assembly is shown generally at 10 and includes a pair of casing members 12 and 14 adapted to be secured together in any convenient manner. The upper casing member 12 has a threaded boss 16 formed thereon which is adapted to be connected with a source of high pressure fuel. Upper casing 12 is formed so as to provide a chamber 18 therein. Likewise lower casing 14 includes a cylindrical bore 20 generally coaxially arranged with respect to the chamber 18 of casing 12.

A hollow sleeve 22 is slidably disposed in bore 20 and terminates at its upper end in a flange portion 24. Bore 20 of casing 14 is radially enlarged to provide a bore section 26 having an annular shoulder 28. A spring member 30 surrounds the slidable sleeve 22 seating at one end on the annular shoulder 28 and at the other end against the flange 24 of sleeve 22 so as to bias said sleeve upwardly into engagement with an annular shoulder 32 formed in the upper casing 12.

A valve member 34 is slidably disposed within the hollow bore of sleeve 22 and extends axially therebeyond. A collar 37 is mounted at the upper end of the valve stem 36 and provides a seat for one end of a spring 38, the other end of which seats within an annular seat 40 formed in the flange 24 of sleeve 22. The lower end of the valve stem 36 has a head portion 44 of a larger diameter than that of the sleeve bore and which portion is held against a seat 46 of sleeve 22 under the influence of spring 38. Valve head 44 and the corresponding seat 46 are of a conical shape. Valve stem 36 has a plurality of axially extending grooves 48 through which fuel is adapted to flow on its way through the valve assembly.

The lower casing 14 has a plurality of radial passages 50 extending therethrough which are adapted to register with an annular groove 52 formed in the periphery of sleeve 22 when the sleeve is in its upper position as shown. Annular groove 52 in turn communicates with a plurality of radially extending passages 54 formed in sleeve 22 and which passages communicate with the longitudial grooves 48 in valve stem 36.

Thus, when the fuel system in which the instant valve device is incorporated is otherwise inoperative to pass liquid fuel, the parts are in the position shown in the drawing. In this position any fuel or air vapors entrapped in the fuel lines may pass through and be vented from the valve mechanism by way of chamber 18, axial grooves 48 and passing radially outwardly through passages 54, annular groove 52 and passages 50 thereby purging the system of the vapors. After the engine is started and liquid fuel begins to flow through the lines, liquid pressure will act upon flange 24 of sleeve 22 to move the sleeve downwardly moving the annular passage 52 out of registry with radial passages 50 thereby cutting off the venting valve mechanism. Spring 30 is made weaker than spring 38 thereby assuring that the sleeve 22 will first be moved downwardly to shut off the venting mechanism as described before any movement of the valve member 34 takes place. During the downward movement of sleeve 22 the valve member 34 is likewise carried downwardly although no relative movement between the valve head 44 and its seat 46 takes place at this time. However, continued flow of liquid fuel will create sufficient pressure to thereafter cause the valve 34 to shift downwardly to move the valve head 44 off seat 46 permitting liquid fuel to be injected into the system. This injection of fuel may either be directly into a cylinder or into an inlet manifold anteriorly of the engine inlet valve.

It will be seen whenever the liquid fuel pressure is sufficient to cause fuel to flow through the system, valve 34 will open permitting only liquid fuel to be emitted therefrom. In this way a steady uninterrupted stream of fuel will be discharged when the valve 34 is open and the sputtering occasioned by the emulsion of liquid fuel and vapor flowing through the injection valve is avoided. Since an engine cylinder takes in measured quantities of fuel and air at timed intervals it is imperative that the flow of liquid fuel is not impeded, as is the case with vapor in the fuel line, lest the combustible charge be too lean.

I claim:

1. A fuel injecting valve mechanism comprising a housing, an inlet and an outlet for said housing, a first valve slidably mounted in said housing, first means resiliently biasing said valve to close said outlet, fuel pressure being adapted to open said valve against the force of said resilient means, a second outlet, a second valve for closing said second outlet, said second valve supporting said first valve, said first resilient means connecting said first and second valves, and second means resiliently biasing said second valve to open said second outlet, said second means being weaker than said first means whereby fuel pressure will close said second valve prior to opening said first valve.

2. A fuel injecting valve mechanism comprising a housing, an inlet and an outlet for said housing, a first valve slidably mounted in said housing, first means resiliently biasing said valve to close said outlet, fuel pressure being adapted to open said valve against the force of said resilient means, a second outlet, a second valve for closing said second outlet, said second valve supporting and providing a seat for said first valve, second means resiliently biasing said second valve to open said second outlet, said second means being weaker than said first means whereby fuel pressure will act upon said first and second valves to close said second valve prior to opening said first valve, and stop means on said housing for limiting the axial movement of said second valve.

3. A fuel injecting valve mechanism comprising a housing, an inlet and a pair of outlets for said housing, a valve slidably mounted in said housing, first means resiliently biasing said valve to open one of said outlets permitting vapors to be eliminated from the mechanism, fuel pressure being adapted to close said valve against the force of said resilient means, a second valve for closing the other of said outlets, said second valve being supported by said first valve in concentric relation therewith, and second means resiliently biasing said second valve to close said other outlet, said first means being weaker than said second means whereby fuel pressure will close said first valve prior to opening said second valve.

4. A fuel injecting mechanism comprising a housing having inlet and outlet openings therein, said housing including a cylindrical bore, a hollow sleeve slidably mounted within said bore, said housing including a pair of axially spaced shoulders, said sleeve including a radially extending flange disposed between said shoulders and adapted to cooperate therewith to limit the axial movement of said sleeve within said bore, said bore including a radially enlarged portion forming an annular seat, a spring member surrounding said sleeve and disposed intermediate said flange and said annular seat for biasing said sleeve against the upper shoulder of said housing, a plurality of radial passages formed in said housing bore, a peripherally disposed annular passage formed on said sleeve and connecting with radial passages communicating with the interior of said sleeve, said radial bore passages being adapted to register with said annular groove when said sleeve is in its upper position, a valve member slidably mounted within said hollow sleeve and including a head member adapted to cooperate with a seat member formed on said sleeve, and second spring means cooperating with said valve to urge said valve head into engagement with the sleeve seat, liquid pressure being adapted to sequentially move said sleeve and said valve causing the former to move said annular groove out of registry with said radial bore passages before the valve member is caused to move off its seat.

5. A fuel injecting mechanism comprising a housing having inlet and outlet openings therein, said housing including a cylindrical bore, a hollow sleeve slidably mounted within said bore, said housing including a pair of axially spaced shoulders, said sleeve including a radially extending flange disposed between said shoulders and adapted to cooperate therewith to limit the axial movement of said sleeve within said bore, said bore including a radially enlarged portion forming an annular seat, a spring member surrounding said sleeve and disposed intermediate said flange and said annular seat for biasing said sleeve against the upper shoulder of said housing, a plurality of radial passages formed in said housing bore, a peripherally disposed annular passage formed on said sleeve and communicating with radial passages communicating with the interior of said sleeve, said radial bore passages being adapted to register with said annular groove when said sleeve is in its upper position, a valve member slidably mounted within said hollow sleeve and including a head member adapted to cooperate with a seat member formed on said sleeve, a cup shaped seat member disposed on the end of the valve stem remote from the head, an annular seat formed on said flange in axially spaced relation with said cup shaped seat, and second spring means disposed intermediate said cup shaped and annular seats to urge said valve head into engagement with the sleeve seat, liquid pressure being adapted to sequentially move said sleeve and said valve causing the former to move said annular groove out of registry with said radial bore passages before the valve member is caused to move off its seat.

References Cited in the file of this patent

UNITED STATES PATENTS

| | | |
|---|---|---|
| 2,033,678 | Buirk | Mar. 10, 1936 |
| 2,277,491 | Huber | Mar. 24, 1942 |
| 2,472,933 | Anderson | June 14, 1949 |